(12) United States Patent
Subhedar et al.

(10) Patent No.: US 9,503,228 B2
(45) Date of Patent: Nov. 22, 2016

(54) SYSTEMS AND METHODS TO DETECT, DIAGNOSE, AND MITIGATE ISSUES IN MULTI-LAYER NETWORKS

(71) Applicants: Sachin Subhedar, Alpharetta, GA (US); Aung Htay, Alpharetta, GA (US); Roger Michael Elbaz, Alpharetta, GA (US); William Webb, Decatur, GA (US)

(72) Inventors: Sachin Subhedar, Alpharetta, GA (US); Aung Htay, Alpharetta, GA (US); Roger Michael Elbaz, Alpharetta, GA (US); William Webb, Decatur, GA (US)

(73) Assignee: Ciena Corporation, Hanover, MD (US)

( * ) Notice: Subject to any disclaimer, the term of this patent is extended or adjusted under 35 U.S.C. 154(b) by 107 days.

(21) Appl. No.: 14/573,396

(22) Filed: Dec. 17, 2014

(65) Prior Publication Data

US 2016/0182344 A1    Jun. 23, 2016

(51) Int. Cl.
     *H04L 1/00*      (2006.01)
     *H04L 1/24*      (2006.01)
     *H04L 12/24*      (2006.01)

(52) U.S. Cl.
     CPC .............. *H04L 1/24* (2013.01); *H04L 41/0823* (2013.01); *H04L 41/142* (2013.01); *H04L 41/16* (2013.01)

(58) Field of Classification Search
     CPC ............. H04L 69/329; H04L 67/1021; H04L 67/1002; H04L 67/1008; H04L 45/02
     USPC ....... 370/241.1, 241, 229, 230; 709/226, 203
     See application file for complete search history.

(56) References Cited

U.S. PATENT DOCUMENTS

| | | |
|---|---|---|
| 2012/0054346 A1* | 3/2012 | Lee ......................... H04L 41/04 709/226 |
| 2014/0003422 A1 | 1/2014 | Mogul et al. |
| 2014/0093246 A1 | 4/2014 | Sambo et al. |
| 2014/0098673 A1 | 4/2014 | Lee et al. |
| 2014/0098710 A1 | 4/2014 | Ong |
| 2014/0177450 A1 | 6/2014 | Chou et al. |
| 2014/0181267 A1 | 6/2014 | Wadkins et al. |

* cited by examiner

*Primary Examiner* — Dady Chery

(74) *Attorney, Agent, or Firm* — Clements Bernard PLLC; Christopher L. Bernard; Lawrence A. Baratta, Jr.

(57) ABSTRACT

A method and server to detect, diagnose, and mitigate issues in a network include receiving Operations, Administration, and Maintenance (OAM) data related to the network, the OAM data related to current operation of the network; instantiating a rule engine to evaluate one or more rules based on any one of the OAM data, an event, policy, and an anomaly; and performing one or more actions based on the evaluating the one or more rules. A Software Defined Networking (SDN) controller is also described.

20 Claims, 12 Drawing Sheets

```
2649 South 23rd Street, Abilene, TX 79605, USA
Construction Dig lat is : 32.420856
Construction Dig lng is : -99.75551
Network Element lat is : 32.11111
Network Element lng is : -95.23111
Decimal Degrees Distance between NE and 811 operation is : 14.606813
Risk Level is : 0

8920 Jill Street, White Settlement, TX 76108, USA
Construction Dig lat is : 32.748352
Construction Dig lng is : -97.470764
Network Element lat is : 32.11111
Network Element lng is : -95.23111
Decimal Degrees Distance between NE and 811 operation is : 3.5146096
Risk Level is : 0

Marquez, TX 77865, USA
Construction Dig lat is : 31.239347
Construction Dig lng is : -96.25358
Network Element lat is : 32.11111
Network Element lng is : -95.23111
Decimal Degrees Distance between NE and 811 operation is : 1.1728742
Risk Level is : 0

18602 Canoe Brk, San Antonio, TX 78258, USA
Construction Dig lat is : 29.613283
Construction Dig lng is : -98.553474
Network Element lat is : 32.11111
Network Element lng is : -95.23111
Decimal Degrees Distance between NE and 811 operation is : 1.3301817
Risk Level is : 0

1321 Broadway Street, Lubbock, TX 79401, USA
Construction Dig lat is : 33.58433
Construction Dig lng is : -101.85263
Network Element lat is : 32.11111
Network Element lng is : -95.23111
Decimal Degrees Distance between NE and 811 operation is : 4.4945884
Risk Level is : 0

Aggregate Risk Level is : 29
```

FIG. 12

SYSTEMS AND METHODS TO DETECT, DIAGNOSE, AND MITIGATE ISSUES IN MULTI-LAYER NETWORKS

FIELD OF THE DISCLOSURE

The present disclosure relates generally to networking systems and methods. More particularly, the present disclosure relates to systems and methods to detect, diagnose, and mitigate issues in multi-layer networks, such as with Software Defined Networking (SDN).

BACKGROUND OF THE DISCLOSURE

Current applications of a Multilayer Path Computation Engine (ML-PCE) in Software Defined Networking (SDN) have a static view of a multi-layer network, and algorithms that calculate routes only focus on finding constraint optimized paths for services provisioned. The real nature of any network however is dynamic and vulnerable to the vagaries of underlying infrastructure, namely the network elements, internal/external links, etc. Network Management Systems (NMS) perform continuous data aggregation that is monitored by system engineers and support groups. The collection of this historical data reveals different facets of the network. Alarms capture a time it was raised, severity, the component that raised it, description, whether it was acknowledged, probable cause, clear time and type of alarm, among other details. Performance Monitoring (PM) data aggregates network traffic observed at regular intervals on each port provisioning a service. In addition, it also gathers information like the collection time, packet loss, oversize or undersize packets received and errors. However, this data is only used to detect problems, like a system component malfunction, crossing of performance threshold, configuration mismatch, signal loss, loss of communication, etc. Conventionally, there is no systematic manner of dynamic feedback that enables the network to automatically alter behavior based on event/PM/alarm data. The historical data on a single element is not analyzed with respect to neighboring connections which might be indicative of a much bigger issue.

Another aspect, in a network topology is the number of services provisioned on the network. For example, services can be Sub-Network Connection (SNCs), Label Switched Paths (LSPs), etc. Details on the services for a network provide information on signal type, source and destination node, its protection class and the ingress/egress ports at each hop. Based on the physical location of Network Elements (NE) and business policies, some have significantly more services than others. In addition, some NEs might be on protection paths for other services. Critical communication or signal loss on NE/components with a lot of services can have a potentially much greater impact than on a relatively less utilized NE.

A Path Computation Engine (PCE) or other path computation component finds routing paths based on a set of constraints in order to efficiently use network resources. PCEs are described in IETF RFCs 4655 and 5440 and HTTP RFCs 7230-7237. The constraints can be defined literally as physical constraints or non-physical constraints; that is, if constraints are placed on Network Elements (NEs), the PCE will calculate a path that includes as few of these constraints as possible for optimal traffic forwarding. Constraints can include physical impediments on transportation mediums, levels of guaranteed bandwidth based on the level of customer buy-in, the importance of the nodes the traffic is forwarded on, etc. Conventionally, network path calculation does not dynamically consider external factors, such as extreme weather, construction projects, etc. into consideration for determining risk assessment on links and other network elements. Network operators must be aware of probable circumstances that could affect their network capabilities and ensure customer satisfaction is satisfactory or better through guarantees of "bandwidth-on-demand" availability and consistent operability of network devices and mediums.

Also, conventionally, Path Computation Element (PCE) outlook is completely resource centric, i.e. it considers NEs and their ports with available links to find reasonable paths. Even if there is an issue indicated by historical alarm/PM or event data, that knowledge is not analyzed or incorporated in path computation. NEs or ports that are already under more stress may end up being part of even more services, which is not desirable. Also in the current setup, once a service is provisioned, the path stays static unless there is a disruption. The network does not proactively suggest an alternate path based on changing network dynamics. Occasionally, business policies that dictate service path or service-level agreements (SLA) change over time. However, currently, that change cannot be automatically reflected in the underlying provisioned service.

BRIEF SUMMARY OF THE DISCLOSURE

In an exemplary embodiment, a method to detect, diagnose, and mitigate issues in a network includes receiving Operations, Administration, and Maintenance (OAM) data related to the network, the OAM data related to current operation of the network; instantiating a rule engine to evaluate one or more rules based on any one of the OAM data, an event, policy, and an anomaly; and performing one or more actions based on the evaluating the one or more rules. The one or more rules can be in a syntax of when one or more conditions are met then perform the one or more actions. The instantiating can be performed based on detecting the event or the anomaly from monitoring the OAM data. The OAM data can be any of alarms, Performance Monitoring (PM) data, and events. The one or more actions can include biasing a Path Computation Element (PCE) or other path computation component away from nodes and/or links in the network with detected issues. The one or more actions can include suggesting a new link in the network or suggesting traffic rearranging to free up capacity on some links. The one or more actions can include communicating a current state of the network to a Path Computation Element (PCE) or other path computation component to update administrative weights used in a path computation. The one or more actions can include any of generation of severity ticket intimating network management personnel of the underlying systemic fault in network, invocating of other Software Defined Networking applications to optimize network, and triggering a new rule to operate.

The method can further include receiving external data related to the network, the external data describing events related to construction, weather, natural disasters, or planned outages; and analyzing the external data to determine a relationship between the events and the network elements in the network, wherein the relationship includes distance, amount of time the event exists, a number of events in a shared area, reputation of an event based on historical data, and a magnitude of collateral damage an event may cause to generate an associated risk level. The relationship can be determined through geocoding the events and the network elements and calculating the distance based thereon, parsing environmental event consolidation programs for end and start times of an event to calculate a time window, parsing environmental event consolidation programs for historical reputation of an event and assigning a value based on credibility, and parsing environmental event consolidation programs for existence of collateral damage multipliers and assigning a value based thereon.

In another exemplary embodiment, a server implementing an application to detect, diagnose, and mitigate issues in a network includes a network interface, a processor, and memory, each communicatively coupled therebetween; wherein the memory stores instructions that, when executed, cause the processor to obtain Operations, Administration, and Maintenance (OAM) data related to the network, the OAM data related to current operation of the network; instantiate a rule engine to evaluate one or more rules based on any one of the OAM data, an event, policy, and an anomaly; and perform one or more actions based on an evaluation of the one or more rules. The one or more rules can be in a syntax of when one or more conditions are met then perform the one or more actions. The rule engine can be instantiated based on detecting the event or the anomaly from monitoring the OAM data. The OAM data can be any of alarms, Performance Monitoring (PM) data, and events. The one or more actions can include biasing a Path Computation Element (PCE) or other path computation component away from nodes and/or links in the network with detected issues. The one or more actions can include suggesting a new link in the network or suggesting traffic rearranging to free up capacity on some links. The one or more actions can include communicating a current state of the network to a Path Computation Element (PCE) or other path computation component to update administrative weights used in a path computation. The one or more actions can include one of triggering a new rule to operate, generation of severity ticket intimating network management personnel of the underlying systemic fault in network, or invocation of other Software Defined Networking applications to optimize the network.

The instructions that, when executed, can further cause the processor to receive external data related to the network, the external data describing events related to construction, weather, natural disasters, or planned outages, and analyze the external data to determine a relationship between the events and the network elements in the SDN network, wherein the relationship comprises distance, amount of time the event exists, a number of events in a shared area, reputation of an event based on historical data, and a magnitude of collateral damage an event may cause to generate an associated risk level. The relationship can be determined through geocoding the events and the network elements and calculating the distance based thereon, parsing environmental event consolidation programs for end and start times of an event to calculate a time window, parsing environmental event consolidation programs for historical reputation of an event and assigning a value based on credibility, and parsing environmental event consolidation programs for existence of collateral damage multipliers and assigning a value based thereon.

In a further exemplary embodiment, a Software Defined Networking (SDN) controller communicatively coupled to a network and to a Software Defined Networking (SDN) application is described to detect, diagnose, and mitigate issues in the network. The SDN controller includes a network interface, a processor, and memory, each communicatively coupled therebetween; wherein the memory stores instructions that, when executed, cause the processor to communicate Operations, Administration, and Maintenance (OAM) data related to the network, the OAM data related to current operation of the network to an SDN application, cause a rule engine to be instantiated to cause evaluation of one or more rules based on any of the OAM data, an event, policy, and an anomaly, and communicate one or more actions based on the evaluation to a Path Computation Element (PCE) or other path computation component. The instructions that, when executed, can further cause the processor to receive external data related to the network, the external data describing events related to construction, weather, natural disasters, or planned outages, and analyze the external data to determine a relationship between the events and the network elements in the network, wherein the relationship comprises distance, amount of time the event exists, a number of events in a shared area, reputation of an event based on historical data, and a magnitude of collateral damage an event may cause to generate an associated risk level. The relationship can be determined through geocoding the events and the network elements and calculating the distance based thereon, parsing environmental event consolidation programs for end and start times of an event to calculate a time window, parsing environmental event consolidation programs for historical reputation of an event and assigning a value based on credibility, and parsing environmental event consolidation programs for existence of collateral damage multipliers and assigning a value based thereon.

BRIEF DESCRIPTION OF THE DRAWINGS

The present disclosure is illustrated and described herein with reference to the various drawings, in which like reference numbers are used to denote like system components/method steps, as appropriate, and in which:

FIG. 10 is a flow chart of an SDN forecasting method which dynamically considers external risks for inclusion in routing constraints in a PCE or the like;

FIG. 12 is a screen shot of an exemplary output associated with an SDN application implementation of the SDN forecasting method of FIG. 10.

DETAILED DESCRIPTION OF THE DISCLOSURE

In various exemplary embodiments, systems and methods are described to detect, diagnose, and mitigate issues in multi-layer networks. The systems and methods closely review the historical data continuously generated by the network in the form of alarms, PM and events, as well as the topology setup itself in terms of provisioned services on the network and inventory. This historical data in conjunction with business policies are analyzed by a dynamically generated rule-based decision framework to create a list of actionable suggestions. Exemplary suggestions may include a) a suggestion to the PCE to choose paths that avoid stressful ports and sub-networks, b) additional constraints to PCE due to change in business policies, c) a suggestion to bias potential links to the network planners in order to minimize network congestion, d) specialized trouble ticket generation that can help system engineers better diagnose root cause issues across the network, and the like.

The systems and methods advantageously provide a new approach to detect, evade and diagnose issues within a multi-layer network; use rule-sets to implement business policies that determine priority of a service being provisioned; direct PCE or other path computation engines to evade paths with possible issues that are determined by analyzing alarms, PM data, events or any other data points collected by network management systems, SDN controllers, etc.; recognize that a path suggested by PCE or other path computation engines can be expensive and propose a new link to user with related cost; suggest bandwidth changes to a link, use of transform links if the network path is physically over long distances or beyond certain quality thresholds; and the like.

The systems and methods provide a unique approach to detect, evade and diagnose issues within a multi-layer network. As described herein, currently, network management systems continue to collect alarms, PM data and events for a network, but that data is not utilized beyond manual analysis. One of the benefits of the systems and methods is to get insight into the health of NE and links by analyzing the data generated by it. Another benefit is utilizing the ability of rule engines to process large amounts of data spread across many variables whose relationship can be defined by predicate logic. The systems and methods apply rule engines to detect problem areas in network components. Using a series of rule sets, the rule engine can provide feedback to the path computation engine and evade areas of concern while provisioning a service. The systems and methods also allow provisioning of services with a priority determined by time-sensitive business policies. If the priority so demands, and a service is unfortunately provisioned on an expensive route, rule sets can call out to external algorithms to get a proposed link addition.

Figure 1:
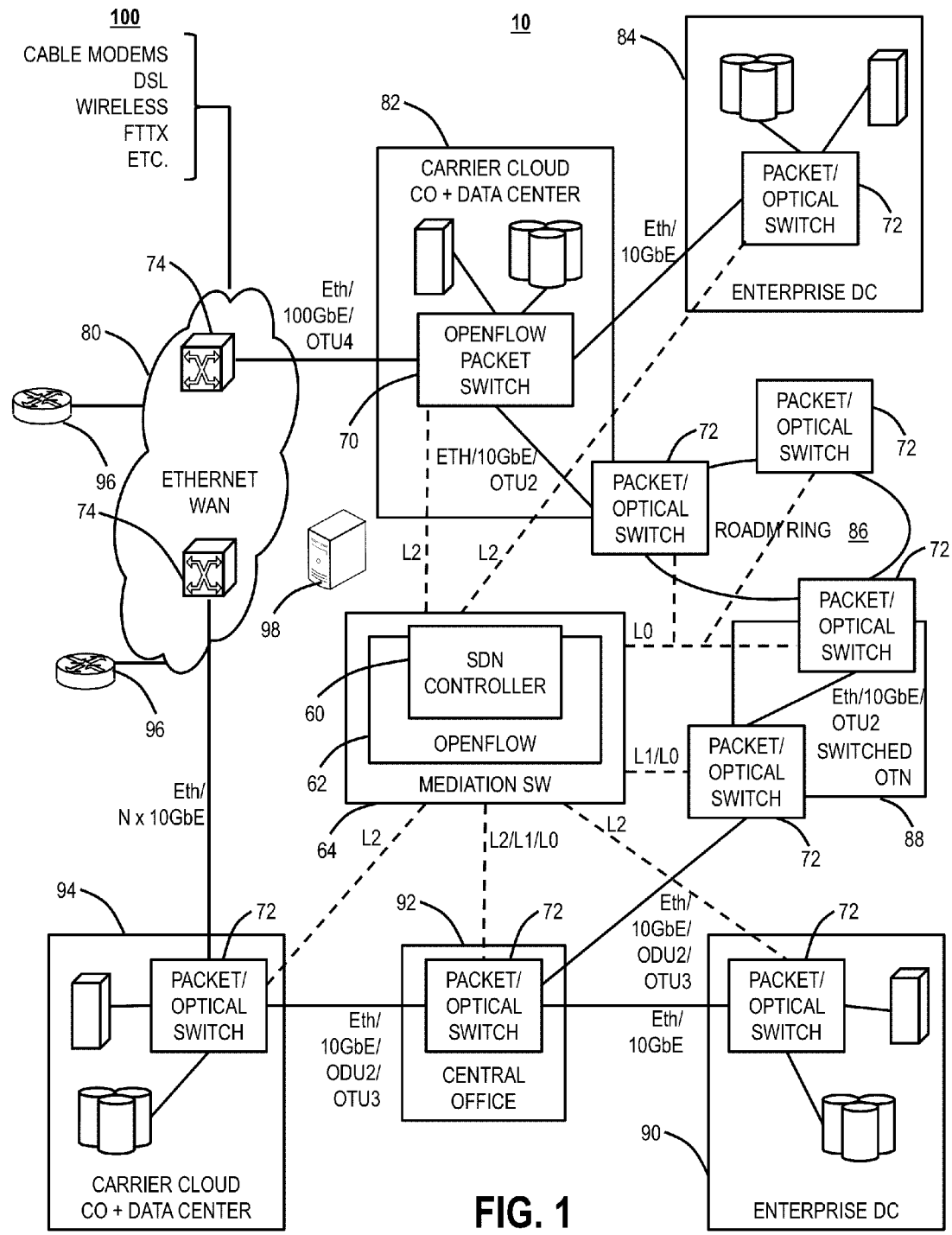
FIG. 1 is a network diagram of an exemplary network for describing the systems and methods.

Referring to FIG. 1, in an exemplary embodiment, a network diagram illustrates an exemplary network 10 for describing the systems and methods. Those of ordinary skill in the art will recognize that any network configuration, such as at Layers 0, 1, 2, and/or 3, is contemplated with the systems and methods, and the network 10 is merely presented for illustration. The network 10 is an SDN network, which includes an SDN controller 60 with the ability to (logically) centrally program provisioning of forwarding in the network 10 in order for more flexible and precise control over network resources to support new services. Application Programmable Interfaces (APIs) provide programmatic communication between an SDN controller and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Specification, Version 1.1.0 (February 2011)—Version 1.3.0 (June 2012), the contents of which are incorporated by reference herein. While OpenFlow describes one version of an SDN interface, other SDN protocols besides OpenFlow (such as Netflow, REST, etc.) are also contemplated with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—each communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can be traditional Ethernet switches that are not controlled by the SDN controller 60. The network 10 can include various end user access technologies 100, such as, without limitation, cable modems, digital subscriber loop (DSL), wireless, fiber-to-the-X (e.g., home, premises, curb, etc.), and the like.

The network 10 has various networking components that have associated historical data, i.e. alarms, events, PMs, etc. This historical data can be referred to as Operations, Administration, and Maintenance (OAM) data pertaining to, for example, DWDM, OTN, SONET, SDH, Ethernet, Multiprotocol Label Switching (MPLS), IP, etc. Today's traditional method of instrumenting network performance involves network elements (e.g., the switches 70, 72, 74, 88) collecting lots of raw data associated with simple OAM packets and bytes. The raw data is uploaded at a coarse time interval (typically 15 minute bins) into a Network Management System (NMS) where it is organized according to a structured database and monitored for threshold crossing alarms.

This approach is based on a narrow scope of cause and effect for each OAM mechanism. At Layer 0, with the introduction of coherent DWDM technology, the network 10 can have a suite of photonic data measured by the Digital Signal Processor (DSP) technology, including, but is not limited to, information relating to the real time monitoring of pre-FEC Bit Error Ratio (BER), optical loss, optical propagation delay, and variations in power levels, optical amplifier gain, optical noise, optical signal to noise ratio, polarization and chromatic dispersion. At Layer 1, the network 10 can have access to a well-defined suite of OAM bytes defined by the ITU-T OTN standard (G.709) that include details of connection performance, continuity, connectivity and latency for end-to-end paths as well as individual links. At Layers 2 and 3, the network 10 can have access to packet OAM statistics defined by standards organizations like MEF, IEEE, ITU-T and IETF for Ethernet, MPLS and IP packet flows and tunnels. Currently, this OAM data is collected and monitored on a per-layer basis, it is directly associated with the layer service in question and it is monitored in pseudo real time.

In the context of the systems and methods described herein, the SDN controller 60 and associated applications thereon are continually monitoring OAM and performance monitoring data over time in the network 10. The systems and methods take advantage of the SDN paradigm to access relevant network data through open Application Programming Interfaces (APIs) such as associated with the SDN controller 60.

Figure 2:
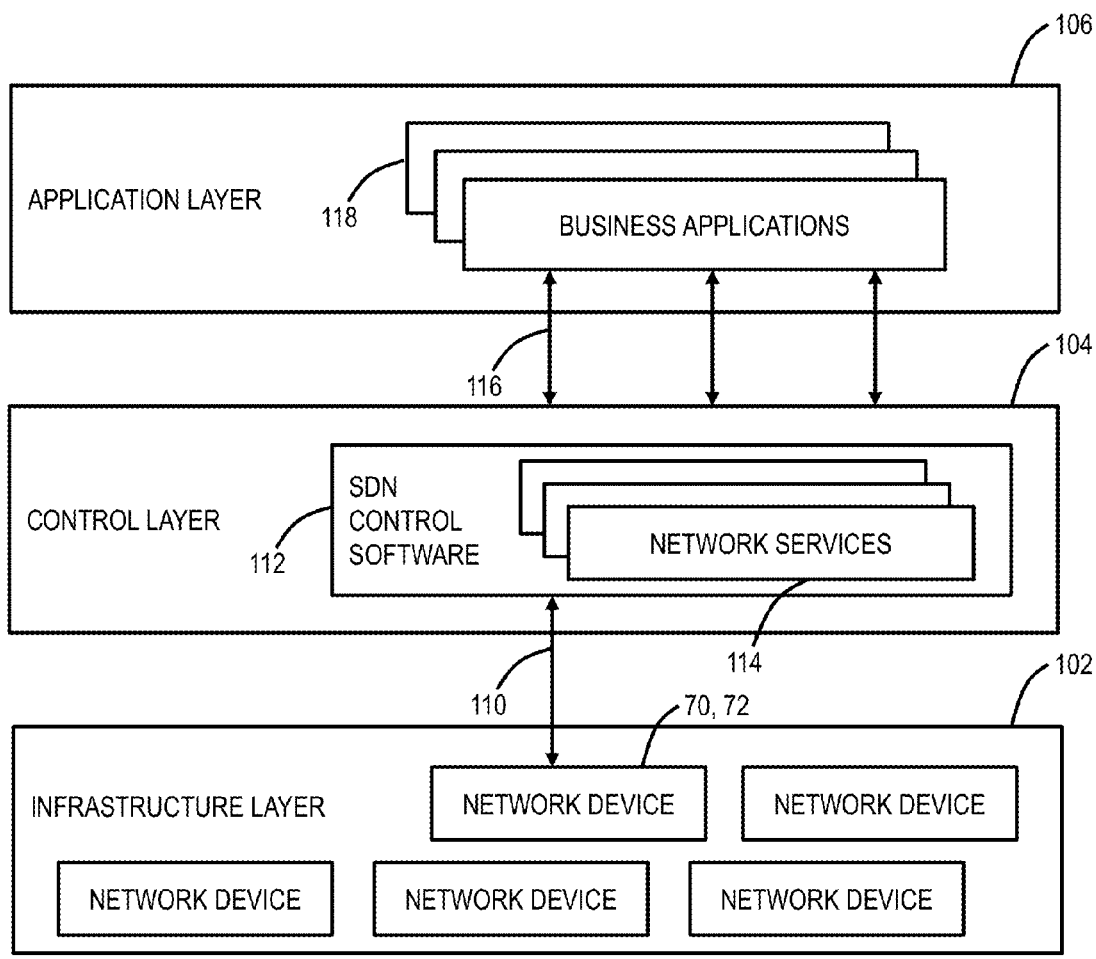
FIG. 2 is a block diagram of functional components of an SDN controller in the exemplary network of FIG. 1.
Figure 3:
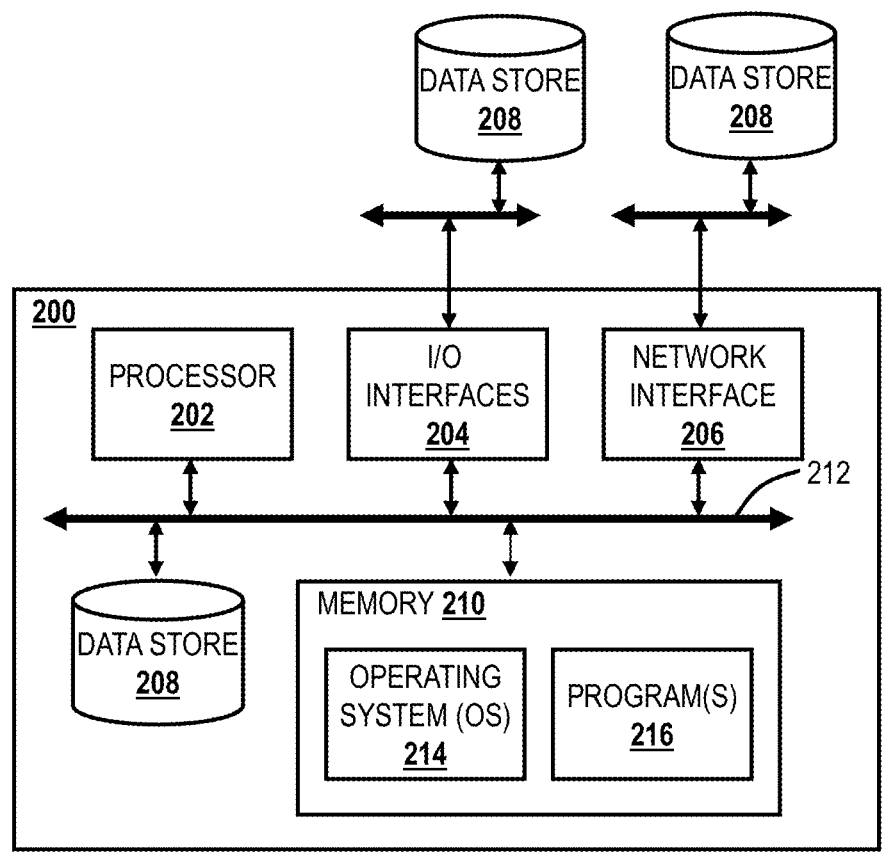
FIG. 3 is a block diagram of a server which may be used to implement the SDN controller of FIG. 2.

Referring to FIG. 2, in an exemplary embodiment, a block diagram illustrates functional components of the SDN controller environment 60. The SDN controller 60 functions 104 and 106 can be implemented on a server or the like such as illustrated in FIG. 3 and the functional components can be implemented in software executed on the server. The SDN controller environment 60 includes a programmable infrastructure layer 102, a control layer 104, and an application layer 106. The programmable infrastructure layer 102 comprises network devices such as the switches 70, 72 and is communicatively coupled to the control layer 104 via a control plane interface 110 such as OpenFlow, for example. The control layer 104 facilitates communication between the application layer 106 and the network devices 70, 72 located in programmable infrastructure layer 102. The control layer 104 includes SDN control software 112 with a plurality of network services 114. The control layer 104 provides SDN functionality to manage network services through abstraction of lower level functionality. The application layer 106 communicates to the control layer 104 through various Application Programming Interfaces (APIs) 116. The application layer 106 provides end user connectivity to the SDN such as software modules and/or functions responsible for creating desired path and flow connections on the physical network through various business applications 118. In an exemplary embodiment, the systems and methods described herein are implemented as one of the business applications 118 on the SDN controller 60 and/or on a separate server 200.

Referring to FIG. 3, in an exemplary embodiment, a block diagram illustrates a server 200 which may be used to realize the SDN controller 60, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Figure 4:
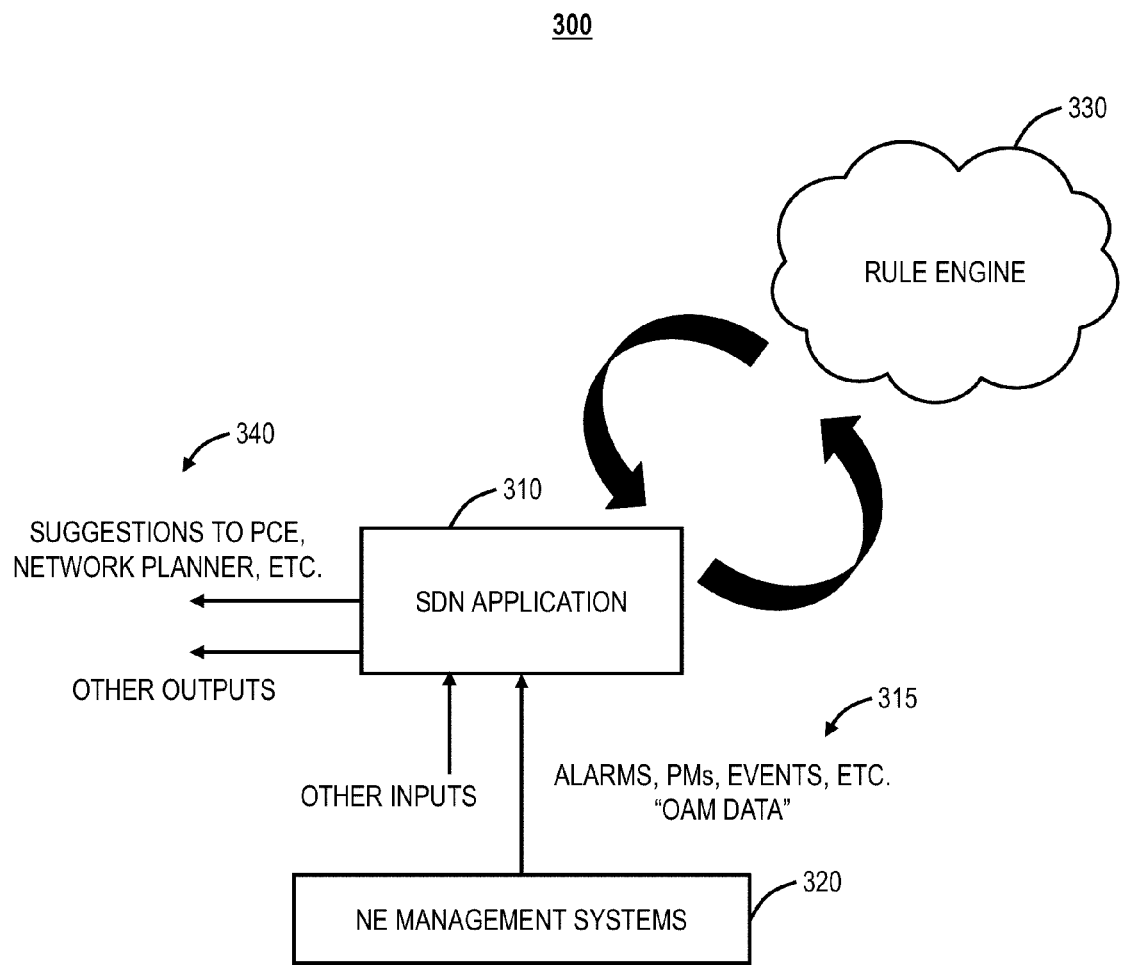
FIG. 4 is a block diagram of a system to detect, diagnose, and mitigate issues in multi-layer SDN networks, such as the exemplary network of FIG. 1.

Referring to FIG. 4, in an exemplary embodiment, a block diagram illustrates a system 300 to detect, diagnose, and mitigate issues in multi-layer SDN networks, such as the network 10. The system 300 includes an SDN application 310 that performs a predictive analysis of layer-1 historical data as well as the current state of network topology to indicate 'stress' level of a node, its components and external links in the network. The SDN application 310 can be one of the business applications 118, can be implemented on the server 200, etc. All the alarms/PM data, events, etc. (collectively OAM data 315) generated by NEs are captured at regular intervals by NE management systems 320. The OAM data 315 is provided to the SDN application 310 where it is parsed and converted to data objects. Based on customizable thresholds for the OAM data 315, the SDN application 310 can dynamically spawn a decision rule engine 330 and inserts the data objects to its working memory. In addition to the OAM data 315, other inputs can include historical OAM data, network topology data, currently provisioned services, and the like.

The rule engine 330 has a set of configurable rules that can aggregate the OAM data 315, i.e. alarms, PM or events. The aggregated data coupled with knowledge about services and home/protect routes can be used by the rule engine 330 to assess the risk of nodes and components/ports. Component risk can be quantified using variable multilayer network management components, for instance admin weights, and communicated to PCE or other path computation components on the fly, for use therein. With the system 300, a state of a network can be analyzed to identify topology points that show a potential for failure as well the impact in case such a failure did happen. If the suggested paths, as calculated by PCE or other path computation components, have combined measure of multilayer network management components, for instance admin weight exceeding a threshold, then the system 300 can suggest additional resource links to spread out points of failure.

The system 300 recognizes that the NE management systems 320 continually collect the OAM data 315 and offer a real-time analysis of this data to get insight into the health of the nodes and links by analyzing the OAM data 315. The rule engine 330 includes a series of rule sets that enable the SDN application 310 to provide feedback to the PCE or other path computation component, such as to avoid areas of concern while provisioning a service.

The rule engine 330 provides a logical representation of domain specific best practices which can then be used to perform analysis or deduce actions or both. Similar techniques for the rule engine 330 are used in financial applications, loan underwriting, personal credit analysis, market trend analysis, defining insurance policies, medical and pharmaceutical fields to name a few. This is a data driven approach where available facts and objects in the system 300 drives which rules will fire. Firing of a rule can in turn generate new facts or take action external to the system 300, such as through suggestions 340, OAM issue tracking (e.g., ticket generation), etc.

Decision points reflect a real time state of underlying nodes and links in the network and are used to guide the PCE or other path computation component in provisioning new and existing services. That is, the system 300, through the SDN application 310 reviews the OAM data 315, applying the rule engine 330, to provide the suggestions 340 to the PCE or other path computation component as well as to network management systems or the like. Also, the suggestions 340 can include generating tickets for operations personnel and the like. For example, services provisioned at Layer 1 may be defined by a SNC which can either be permanent or mesh restorable. In providing full or partial protection to services protection routes can be reserved, severely affecting the overall network utilization. Path computation algorithms exist to identify optimal paths for new services and schedule identified paths considering current network constraints. The system 300 exploits path computation to exhaust far reaching options in network topology to get an optimal SNC for the service.

Figure 5:
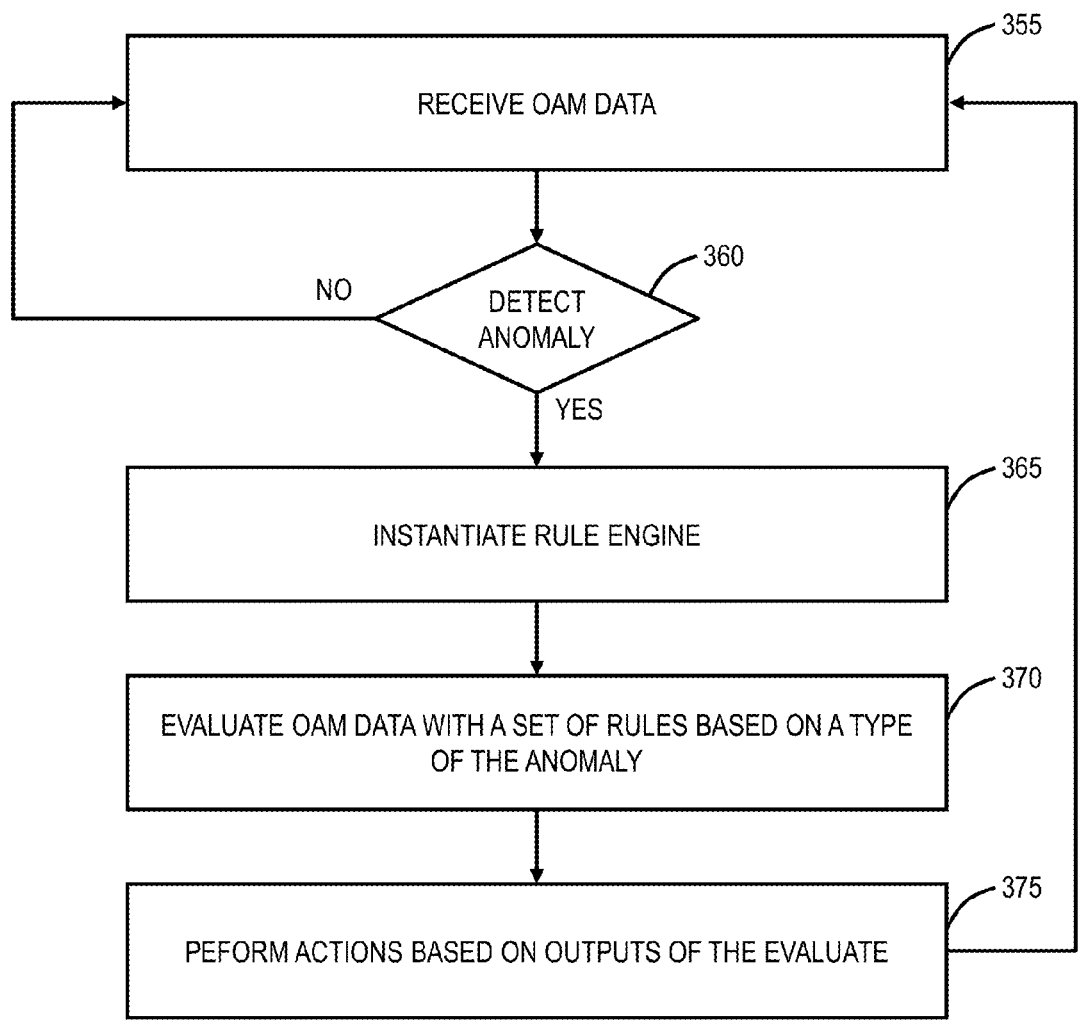
FIG. 5 is a flow chart of a method 350 to detect, diagnose, and mitigate issues in multi-layer SDN networks, such as the exemplary network of FIG. 1.

Referring to FIG. 5, in an exemplary embodiment, a flow chart illustrates a method 350 to detect, diagnose, and mitigate issues in multi-layer SDN networks, such as the network 10. Specifically, the method 350 describes functionality performed at the SDN application 310 in the system 300. The method 350 includes receiving the OAM data 315 (step 355). The OAM data 315 can be continually provided to the SDN application 310 from the NE management systems 320. Alternatively, the OAM data 315 can be provided at regular or various intervals. Note, the received OAM data 315 is received in working memory. The method 350 includes continually looking to detect an anomaly or event (step 360). The anomaly is detected in the OAM data 315 and can include, for example, threshold crossings, alarms, events, etc. If not anomaly is detected (step 360), the method 350 continues to receive the OAM data 315 (step 355), and can remove older OAM data 315 from the working memory.

Once an anomaly is detected (step 360), the method 3500 includes instantiating a rule engine (step 365). The rule engine 330 is configured to provide decision points for a multi-layer PCE or path computation component. When the rule engine 330 is instantiated, it has a set of rules configured based on the type of alarms, PM or events present in working memory, i.e. the OAM data 315. Each rule in the set of rules takes a when-then form capable of expressing statements in higher order logic. That is, each rule takes the following form:

| When | <conditions are met> |
|------|----------------------------|
| Then | <perform these actions> |

The conditions can be related to the OAM data 315 such as alarms, threshold crossing, specific events, etc.; related to operating conditions in the network such as services provisioned, link state, node state, etc.; related to the output of other rules in the set of rules; and the like. The actions can be the suggestions 340, triggering a new rule to operate, updating the OAM data 315, updating node and link data in the network, and the like. Note, the conditions can be a logical expression and include multiple criteria, such as when A and B and C, then X, Y, and Z; when A or B, then X; etc.

The following descriptions provide some exemplary rules. In the following descriptions, terms such as $name, $component, and $port represent variables. First, for all the SNCs that are aggregated on originating, terminating and intermediate nodes and ports:

| Rule Name | Add SNC to a node |
|---|---|
| When | There exists an SNC with source NE name $name; The SNC is not processed yet; and There exists a node with NE name $name |
| Then | Add the SNC to the node Mark the SNC as processed |

Here, the above rule adds an SNC to a node, through the SDN application 310. Note, the connection is described as an SNC for illustration purposes; it could also be an LSP, etc. From the OAM data 315, it is determined that there is an SNC with from a certain source NE, the SNC has not been processed, and there is a node in the network matching the source NE. As such, the SNC is added to the node and marked as processed.

Second, for alarms, PMs, and event objects aggregated on nodes and ports:

| Rule Name | Set critical communication alarm on a node |
|---|---|
| When | There exists an alarm with Severity = 'critical' and type = 'communication'; Alarm is on a node with $name and $component and the alarm is unprocessed; and There exists a node with NE name $name with component $component |
| Then | Aggregate the alarm on the node as well as component if it is a port Mark the alarm as processed |

Here, the above rule processes a critical communication alarm on a node, by detecting it in the OAM data 315, determining it is unprocessed, and determining there is a node in the network with the alarm. This rule has been named "Set critical communication alarm on a node," and there can be various additional, similar rules such as:

```
Set Critical environmental alarm on node and port
Set Critical equipment alarm on node and port
Set Critical performance alarm on node and port
Set Critical processing alarm on node and port
Set Critical protection alarm on node and port
Set Critical Quality of Service alarm on node and port
Set Critical service report alarm on node and port
Set Critical standing condition alarm on node and port
Set Critical timing alarm on node and port
```

There can also be variations of the rule for other alarm severity types, such as major, minor, and warning. Some exemplary, similar rules can include:

```
Set Major communication alarm on node and port
Set Major environmental alarm on node and port
Set Major equipment alarm on node and port
Set Major performance alarm on node and port
```

-continued

```
Set Major processing alarm on node and port
Set Major protection alarm on node and port
Set Major Quality of Service alarm on node and port
Set Major service report alarm on node and port
Set Major standing condition alarm on node and port
Set Major timing alarm on node and port
```

Third, an analysis rule to set risk type of nodes and components could include, for example:

| Rule Name | Mark nodes and ports as risky |
|---|---|
| When | There exists a node with NE name $name; The node has critical communication alarms >5 and warnings >10 in last hour; The node has major alarms >10 and minor alarms >10 in last 2 hours; and The node has not been marked with risk type greater than 'HIGH' |
| Then | Set risk type of the node to 'HIGH' |

Here, for the above rule, the SDN application 310 can keep a rating to determine the health of each node and port, e.g. a risk rating—HIGH, MEDIUM, LOW, etc. The determination of HIGH and/or MEDIUM risk can in turn cause additional rules to be implemented. The risk rating is a mechanism to characterize overall health. Here, for example, the nodes and ports are marked as HIGH risk based on predetermined criteria (which could be modified).

Fourth, a rule to set actionable suggestions for multilayer network management components, for instance admin weight, could include:

| Rule Name | Set admin weight on ports from HIGH and MEDIUM risk nodes |
|---|---|
| When | There exists a node with NE name $name with risk type set to 'HIGH'; There exists a component on the node that is a port $port; and There exists a $port on the node with risk type set to 'HIGH' |
| Then | Set admin weight on the port to $highrisk (e.g. a large value) Mark the port as processed |

Here, the above rule can be implemented subsequent to labeling a node or port as HIGH risk. This particular rule suggests to the PCE or other path computation component to avoid this node in path selection by providing an extremely high administrative weight. Other examples include path suggestions, use of transform link etc.

The aforementioned rules are provided for illustration only and not meant to be exhaustive. The rules are dynamic, and not necessarily sequential. Further, new rules can continually be loaded into the rule engine 330. At the high level, the rules are predetermined behaviors that are implemented responsive to the anomalies, from the OAM data 315, and based on the output of other rules. With the system 300 and the method 350, the OAM data 315 can be dynamically acted upon. In an exemplary implementation, a Java based rule engine such 'www.drools.org' is used to implement the rule engine 330.

Figure 6:
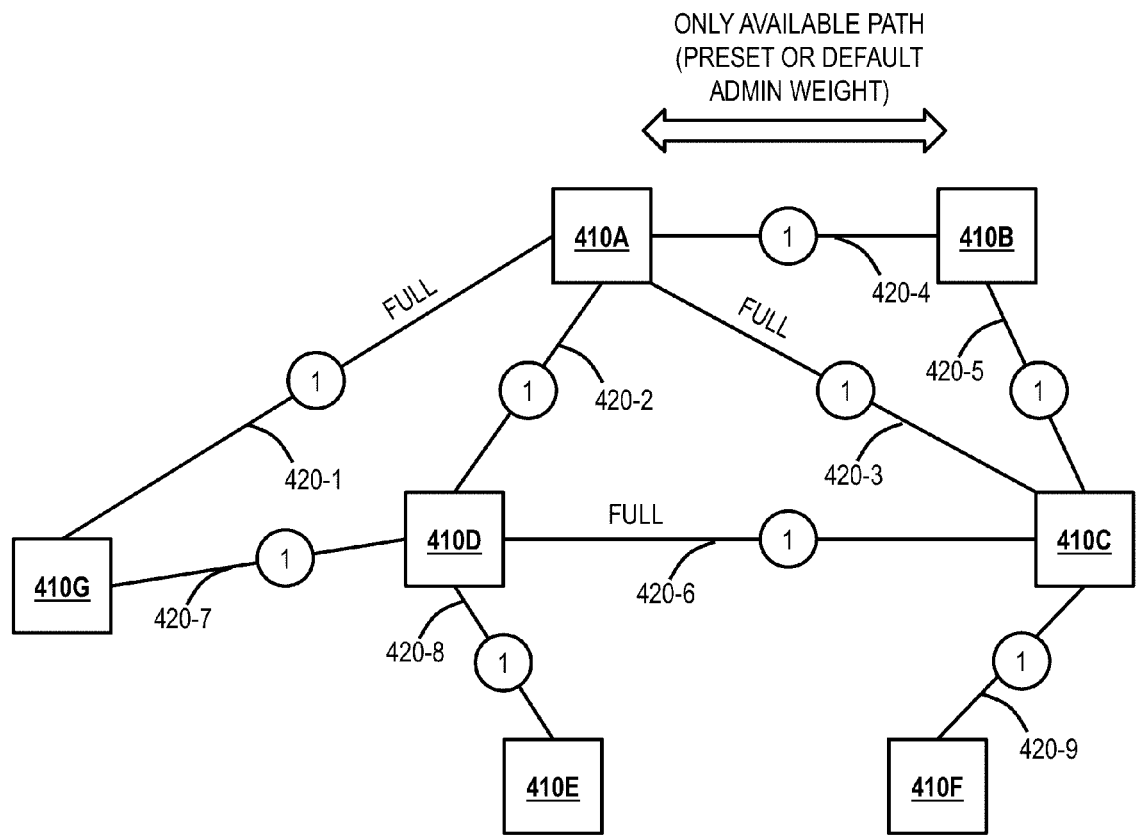
FIGS. 6-9 are network diagrams and a block diagram of an exemplary operation of the system of FIG. 4 and the method of FIG. 5 with a network.
Figure 7:
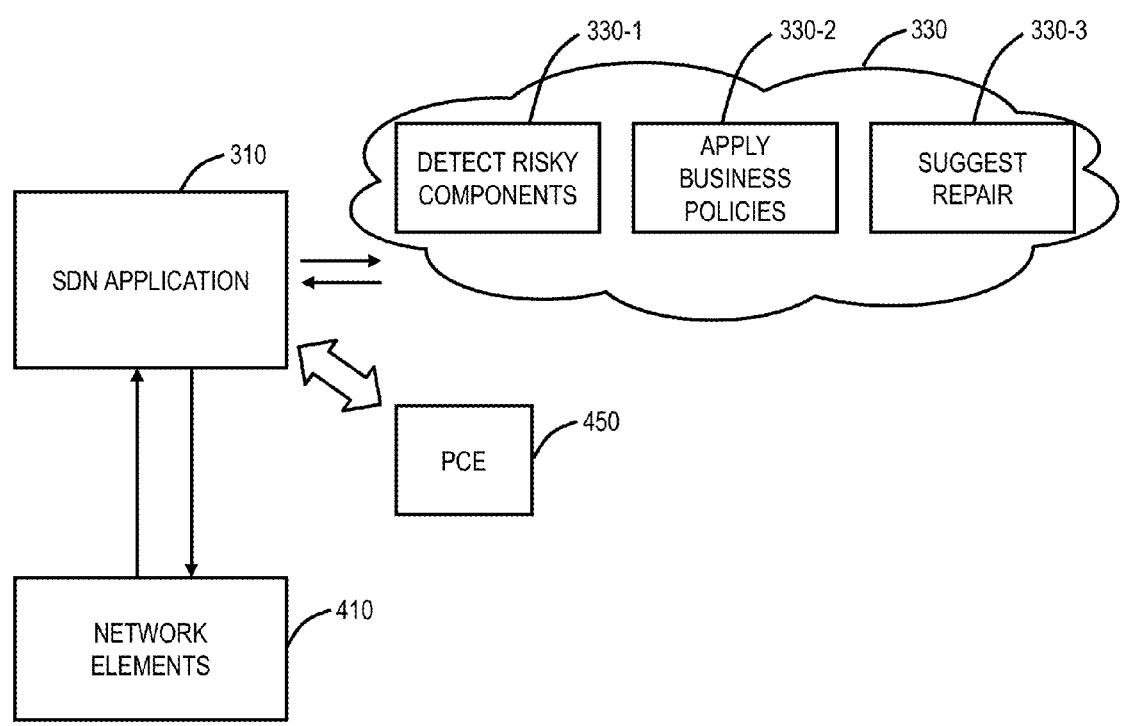
Figure 8:
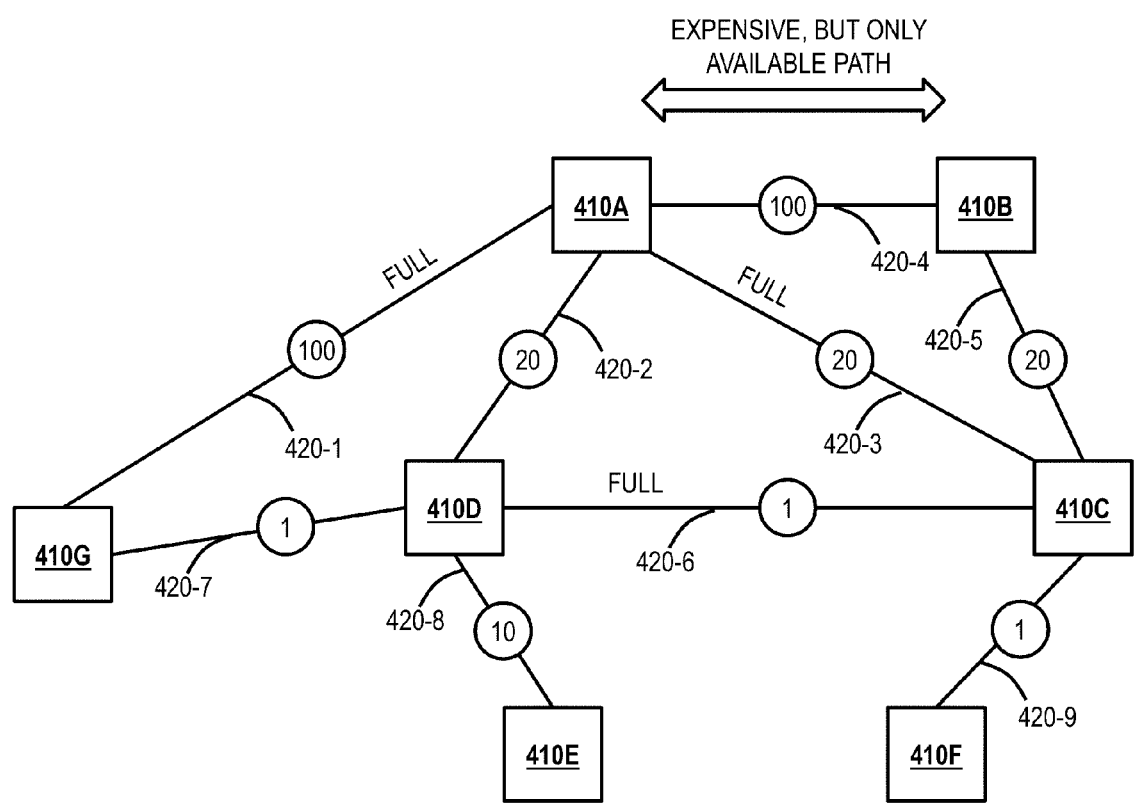
Figure 9:
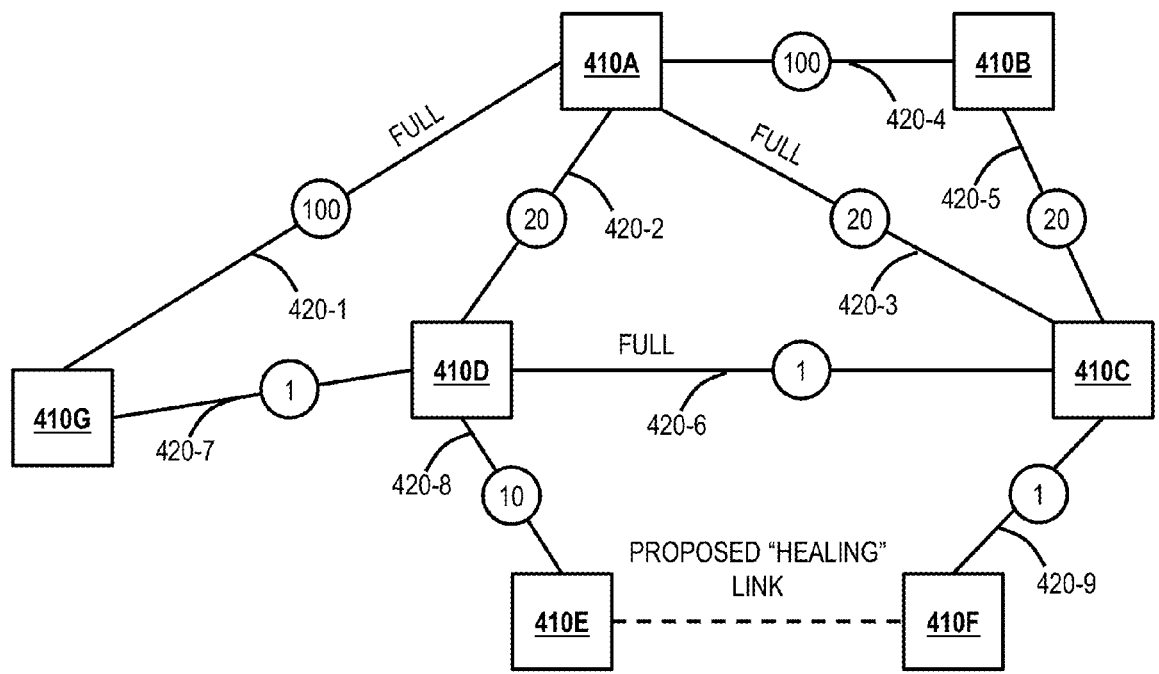

Referring to FIGS. 6-9, in an exemplary embodiment, network diagrams and a block diagram illustrate an exemplary operation of the system 300 and the method 350 with a network 400. The network 400 includes a plurality of nodes 410A-410G connected by a plurality of links 420-1-420-9 in an interconnected mesh, for illustration purposes (FIGS. 6 and 8-9). In the network 400, in FIG. 6, all links 420 have an admin weight of 1. The admin weights are used by a PCE 450 during path selection to determine a lowest cost path between source and destination (here lowest cost means lowest admin weight). Also, since the admin weights are 1, the cost of each path is simply an associated hop count. For illustration purposes, assume links 420-1, 420-3, 420-6 are full, i.e. no excess capacity is available and these links are therefore excluded from any path computation.

Assume a service, e.g. SNC labeled as S1, is desired between the nodes 410A, 410B. The only available path, in FIG. 6, is on the link 420-4, which also happens to be the lowest cost. Business policies determine a priority of service to be provisioned and whether it needs to be provisioned as soon as possible. Currently, the PCE 450 can determine paths only based on available bandwidth and pre-set measure of multilayer network management components, for instance static admin weights.

In an exemplary use case of the SDN application 310, the rule engine 330 is dynamically instantiated with a possible set of 3 rules. FIG. 7 illustrates the system 300 for this operation. Here, the SDN application 310 communicates to the nodes 410 and the PCE 450, and instantiate three exemplary rules 330-1, 330-2, 330-3. The rule 330-1 sets rule parameters based on alarms, PM and events inserted in working memory. This triggers firing of aggregation and analysis rules to detect risky components.

In FIG. 8, the admin weights of the links 420 are updated and modified based on the rule engine 330. Again, the only path between the nodes 410A, 410B is the link 420-4, but this link is now very expensive. The rule 330-2 applies business policies that determine the priority of S1. If it needs to be provisioned as soon as possible, the service is provisioned with an available route, such as the link 420-4, despite the expensive cost. If the admin weight of the route is higher than threshold, the rule 330-3 is triggered.

The rule 330-3 makes calls to an external algorithm to identify potential locations where a link can be added, such as, for example, between the nodes 410E, 410F. Admin weights on these potential links are calculated and the PCE 450 re-computes path for S1. If the admin weight is less than that calculated by the rule 330-1, the path is returned by the SDN application 410 as suggested repair path. Alternatively, the rule 330-3 could include traffic rearranging to free up capacity on some of the full links 420. Various other embodiments are also contemplated.

Figure 10:
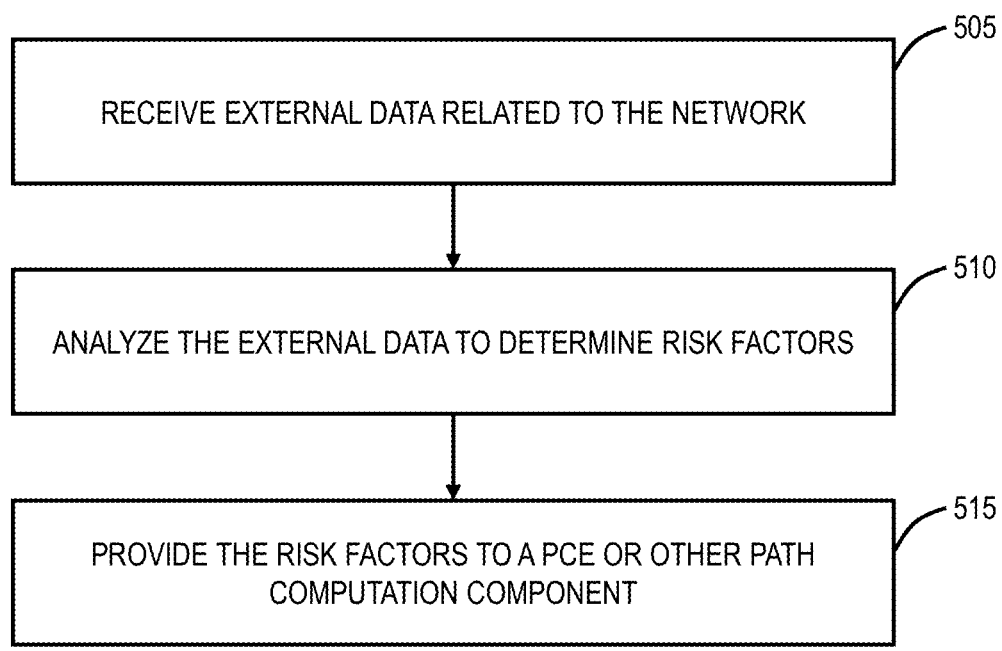

Referring to FIG. 10, in an exemplary embodiment, a flow chart illustrates an SDN forecasting method 500 which dynamically considers external risks for inclusion in routing constraints in a PCE or the like. The SDN forecasting method 500 generally is configured to adjust routing constraints in the PCE dynamically considering various external data sources. That is, the routing constraints can be determined or adjusted based on available physically external environmental risks, determined by metrics and/or data obtained from environmental event consolidation programs or the like. These programs can include utility notification agencies, such as state-specific 8-1-1 construction ticket management systems, the National Ticket Management System (NTMS) for construction digs, inclement weather forecast stations, and any other program which tracks environmental events that may affect a network. The metrics and/or data is used to determine risk which is aggregated and translated into a 'risk level' which is a calculated assessment of likeliness that a single or group of NE(s) (to include transportation mediums, such as fiber plants) may become damaged or significantly impacted. These risk levels are invaluable to the PCE, which in-turn can utilize risk levels in determining or modifying constraints on available paths for forwarding traffic.

The SDN forecasting method 500 can be implemented as an SDN application, such as in the SDN application 310 or the like. The SDN forecasting method 500 includes receiving external data related to the network (step 505). That is, the SDN forecasting method 50 "scrapes and saves" data from construction notification management sites, weather prediction databases, and any database that store data relevant to the performance of network elements. The SDN forecasting method 500 includes dynamically assessing real-time data obtained through multiple sources pertaining to construction projects, extreme weather, and any other factor that could cause bandwidth unavailability to create risk levels that the PCE could consider in routing traffic optimally. Thus, with all of the external data related to the network, the SDN forecasting method 500 includes analyzes the external data to determine risk factors (step 510), and the SDN forecasting method 500 includes providing the risk factors to the PCE or other path computation component (step 515).

An exemplary objective of the SDN forecasting method 500 is to provide a network operator knowledge of impending external factors, such as construction digs, extreme weather, or the like, which may affect the performance of the network. The SDN forecasting method 500 accomplishes this objective dynamically, based off of dates, locations, and other important data supplied by these databases as the external data.

The SDN forecasting method 500 accomplishes its objective by dynamically converting saved addresses and estimated points of determined external events into latitude/longitude coordinates through geocoding, and comparing them to the exact locations of existing network elements. Additionally, the SDN forecasting method 500 loads other relevant data, such as dates, types of external factors, magnitude of these factors, and any other data a network operator might find relevant and converts this data into a "risk factor." These risk factors are dynamically loaded into the PCE as constraints for subsequent determination of stable pathways for forwarding traffic.

Thus, the SDN forecasting method 500 dynamically assesses real-time data obtained through multiple sources pertaining to construction projects, extreme weather, and any other factor that could cause bandwidth unavailability to create risk levels that a Path Calculation engine (PCE) could consider in routing traffic optimally. This is completed by comparing geocoded latitude and longitude points of all inclement situations, such as a heavy construction dig, to the locations of network elements and components, to include nodes and transportation mediums (such as fiber plants). This approach is implementable by a combination of several modern Application Programming Interfaces (APIs) with the SDN application.

With respect to the external data, the SDN forecasting method 500 can utilize any real-time data that provides information related to possible external risks to the network and, more specifically, to network elements in the network. Non-limiting examples of the external data can relate to construction, weather, natural disasters (fire, tornados, etc.), planned outages (electrical, etc.) and the like. That is, network elements are prone to destructive external forces, and the SDN forecasting method 500 provides quantitative techniques to describe these external forces in the context of path computation and the like.

For example, in March 2005, the United States Federal Communications Commission (FCC) made 8-1-1 the universal number for the 71 regional services that coordinate location services for underground public utilities in the U.S. Before that time, each of these "call before you dig" services had its own 800 number, and the FCC and others wanted to make it as easy as possible for everyone planning an excavation to call first. This safety measure not only prevents damage that interrupts telecommunications, but also the cutting of electricity, water mains, and natural gas pipes. Establishment of an abbreviated dialing number for this purpose was required by the Pipeline Safety Improvement Act of 2002. In an exemplary embodiment, an API between the 8-1-1 service and its associated databases can be implemented with an SDN application implementing the SDN forecasting method 500.

In another example, weatherscan (from www.weather.com) features uninterrupted local weather information in graphical format on a continuous loop that is generated by an IntelliStar unit installed at the cable provider's headend. IntelliStar also has an improved graphics display and dynamic radar capabilities. HiRAD (High Resolution Aggregated Data) technology—which was added to the IntelliStar in 2006—allows The Weather Channel to choose any city, town or landmark as an observation/forecast site and provide data. In an exemplary embodiment, an API between a weather forecasting service can be implemented with an SDN application implementing the SDN forecasting method 500.

Pertaining to the concern of lines being cut by construction, or "dig" projects, construction and repair companies are encouraged to call local utility notification agencies, who are responsible for denoting (with colored paints and flags) gas, oil, steam, water, sewer, electric, and communication lines in the area local to the construction according to the American Public Works Administration (AWPA) standards. Using this policy, companies conducting construction near utility lines, whether above or below ground, will have better situational awareness of what exists in their construction perimeter. Occasionally, companies will not call ahead for digs, attributing the excuse to emergency repairs, ignorance of the protocol, or exercising purposeful negligence. In all cases, transportation mediums are often cut, and those who install or depend on the networks are the ones that suffer.

In order to increase the amount of situational awareness given to network operators for any given network, it is important that they are aware of external forces that could negatively impact their networks. This process is quick and dynamic, allowing network operators to have full visibility of potential negative impacts to their networks at all times, without demanding an increase of labor from the operators.

All local utility notification agencies provide free access to anyone who desires to create a dig reservation. This encourages construction companies to call or virtually reserve ahead of time. The same agencies also provide Hyper Text Markup Language (HTML) spreadsheets and documents online denoting the company, time, construction type, and location of reserved construction. The ability to scrape, parse, and utilize this data has just recently become implementable. For example, various services exist which consolidate construction data.

In an exemplary embodiment, addresses are scraped and parsed through a third-party API JSoup (jsoup.org). Using Java, these addresses can be parsed based on key tag label delimiters, and assigned to variables for: Ticket Number, Company Name and Full Address. Using a GeoCoding API, such as from Google, developers.google.com/maps/documentation/geocoding/, these addresses can be converted into longitude/latitude coordinates and stored locally as such. After sending multiple addresses to the GeoCoding API, the addresses are confirmed and returned as latitude/longitude coordinates, and displayed to the user for each address.

Network elements, with known addresses and coordinates (or in the case of transportation mediums, a length of coordinates) can be transformed into latitude/longitude values and compared to the coordinates of events such as construction projects or weather patterns. The distance comparison can be calculated into an aggregated risk level, which can be dynamically used as a constraint for the PCE in determining an administrative weight (importance) for any given network component. Each event can be given a severity (e.g., 1 to 10, 1 to 3, etc.) which can be combined with distance to provide an overall risk level. Aside from distance, other factors that may adjust the risk level, for construction projects, are: reputation of dig company, size and depth of dig project, time spent on dig, use of explosives at a dig site, number of digs near a similar Network Element in a shared time block, etc. All of this information is obtainable through a collaborative effort of parsing 8-1-1 dig sites and the National Ticket Management System (NTMS).

Figure 11:
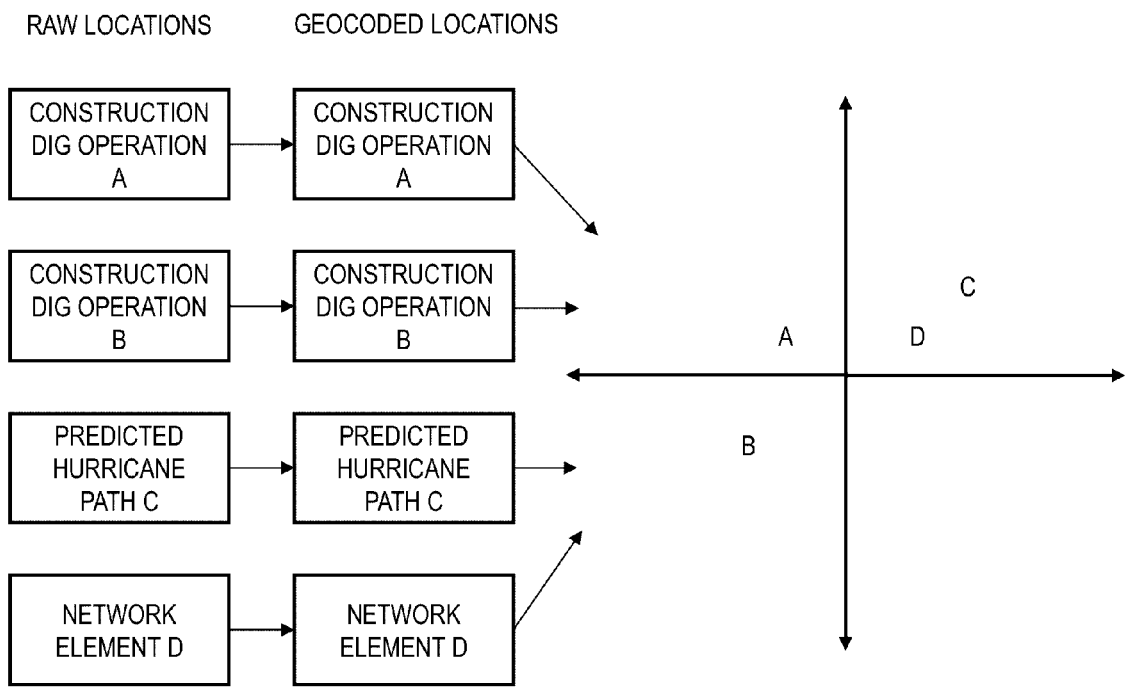
FIG. 11 is a graph and table of an example of the SDN forecasting method of FIG. 11.

Referring to FIG. 11, in an exemplary embodiment, a graph and table illustrate an example of the SDN forecasting method 500. Here, there is a network element D which has both a raw location and a geocoded location. The SDN forecasting method 500 includes three exemplary events, namely construction dig operations A and B and a predicted hurricane path C, each with a raw location and a geocoded location. The locations are listed in the graph, and in the table, the geocoded locations can be used to calculate distance and assess a risk level. For example, the construction dig A is a distance of 2 away and can be assessed a risk level of 1 (e.g., moderate risk), the construction dig B is a distance of 4 away and can be assessed a risk level of 0 (e.g., no risk), and the predicted hurricane path C is a distance of 1.41 away and can be assessed a risk level of 2 (e.g., high risk). A summation of the risk levels can provide an aggregate risk level for the network element D of 3 at this time. Note, the risk level can change over time and can be continually computed based on the SDN forecasting method 500.

Referring to FIG. 12, in an exemplary embodiment, a screen shot illustrates exemplary output associated with an SDN application implementation of the SDN forecasting method 500. Specifically, FIG. 12 utilizes both HTML parsing and geocoding to display exemplary construction events. Note, only a subset of the results are displayed in FIG. 12, the aggregate risk level at the bottom includes 14 other addresses and their associated risk levels in its calculation.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method to detect, diagnose, and mitigate issues in a network, the method comprising:
    receiving Operations, Administration, and Maintenance (OAM) data related to the network, the OAM data related to current operation of the network;
    receiving external data related to the network, the external data describing events related to any one or more of construction, weather, natural disasters, and planned outages;
    instantiating a rule engine to evaluate one or more rules based on any one of the OAM data, an event, policy, and an anomaly;
    performing one or more actions based on the evaluating the one or more rules; and
    analyzing the external data to determine a relationship between the events and network elements in the network, wherein the relationship comprises any one or more of distance, amount of time the event exists, a number of events in a shared area, reputation of an event based on historical data, and a magnitude of collateral damage an event may cause to generate an associated risk level.

2. The method of claim 1, wherein the one or more rules are in a syntax of when one or more conditions are met then perform the one or more actions.

3. The method of claim 1, wherein the instantiating is performed based on detecting the event or the anomaly from monitoring the OAM data.

4. The method of claim 1, wherein the OAM data is any of alarms, Performance Monitoring (PM) data, and events.

5. The method of claim 1, wherein the one or more actions comprise biasing a Path Computation Element (PCE) or other path computation component away from nodes and/or links in the network with detected issues.

6. The method of claim 1, wherein the one or more actions comprise suggesting a new link in the network or suggesting traffic rearranging to free up capacity on some links.

7. The method of claim 1, wherein the one or more actions comprise communicating a current state of the network to a Path Computation Element (PCE) or other path computation component to update administrative weights used in a path computation.

8. The method of claim 1, wherein the one or more actions comprise any of generation of severity ticket intimating network management personnel of an underlying systemic fault in network, invocating of other Software Defined Networking applications to optimize network, and triggering a new rule to operate.

9. The method of claim 1, wherein the relationship is determined through:
    geocoding the events and network elements and calculating the distance based thereon,
    parsing environmental event consolidation programs for end and start times of an event to calculate a time window,
    parsing environmental event consolidation programs for historical reputation of an event and assigning a value based on credibility, and
    parsing environmental event consolidation programs for existence of collateral damage multipliers and assigning a value based thereon.

10. A server implementing an application to detect, diagnose, and mitigate issues in a network, the server comprising:
    a network interface, a processor, and memory, each communicatively coupled therebetween;
    wherein the memory stores instructions that, when executed, cause the processor to
        obtain Operations, Administration, and Maintenance (OAM) data related to the network, the OAM data related to current operation of the network,
        receive external data related to the network, the external data describing events related to any one or more of construction, weather, natural disasters, and planned outages,
        instantiate a rule engine to evaluate one or more rules based on any one of the OAM data, an event, policy, and an anomaly,
        perform one or more actions based on an evaluation of the one or more rules, and
        analyze the external data to determine a relationship between the events and the network elements in the network, wherein the relationship comprises any one or more of distance, amount of time the event exists, a number of events in a shared area, reputation of an event based on historical data, and a magnitude of collateral damage an event may cause to generate an associated risk level.

11. The server of claim 10, wherein the one or more rules are in a syntax of when one or more conditions are met then perform the one or more actions.

12. The server of claim 10, wherein the rule engine is instantiated based on detecting the event or the anomaly from monitoring the OAM data.

13. The server of claim 10, wherein the OAM data is any of alarms, Performance Monitoring (PM) data, and events.

14. The server of claim 10, wherein the one or more actions comprise biasing a Path Computation Element (PCE) or other path computation component away from nodes and/or links in the network with detected issues.

15. The server of claim 10, wherein the one or more actions comprise suggesting a new link in the network or suggesting traffic rearranging to free up capacity on some links.

16. The server of claim 10, wherein the one or more actions comprise communicating a current state of the network to a Path Computation Element (PCE) or other path computation component to update administrative weights used in a path computation.

17. The server of claim 10, wherein the one or more actions comprise one of triggering a new rule to operate, generation of severity ticket intimating network management personnel of an underlying systemic fault in network, or invocation of other Software Defined Networking applications to optimize the network.

18. The server of claim 10, wherein the relationship is determined through:
geocoding the events and network elements and calculating the distance based thereon,
parsing environmental event consolidation programs for end and start times of an event to calculate a time window,
parsing environmental event consolidation programs for historical reputation of an event and assigning a value based on credibility, and
parsing environmental event consolidation programs for existence of collateral damage multipliers and assigning a value based thereon.

19. A Software Defined Networking (SDN) controller communicatively coupled to a network and to a Software Defined Networking (SDN) application to detect, diagnose, and mitigate issues in the network, the SDN controller comprising:
a network interface, a processor, and memory, each communicatively coupled therebetween;
wherein the memory stores instructions that, when executed, cause the processor to
communicate Operations, Administration, and Maintenance (OAM) data related to the network, the OAM data related to current operation of the network to an SDN application,
receive external data related to the network, the external data describing events related to any one or more of construction, weather, natural disasters, and planned outages,
cause a rule engine to be instantiated to cause evaluation of one or more rules based on any of the OAM data, an event, policy, and an anomaly,
communicate one or more actions based on the evaluation to a Path Computation Element (PCE) or other path computation component, and
analyze the external data to determine a relationship between the events and the network elements in the network, wherein the relationship comprises any one or more of distance, amount of time the event exists, a number of events in a shared area, reputation of an event based on historical data, and a magnitude of collateral damage an event may cause to generate an associated risk level.

20. The SDN controller of claim 19, wherein the relationship is determined through:
geocoding the events and network elements and calculating the distance based thereon,
parsing environmental event consolidation programs for end and start times of an event to calculate a time window,
parsing environmental event consolidation programs for historical reputation of an event and assigning a value based on credibility, and
parsing environmental event consolidation programs for existence of collateral damage multipliers and assigning a value based thereon.

* * * * *